(12) United States Patent
Hill (10) Patent No.: US 7,926,830 B2
(45) Date of Patent: Apr. 19, 2011

(54) HITCH ADAPTER

(76) Inventor: Curt J. Hill, Warba, MN (US)

( * ) Notice: Subject to any disclaimer, the term of this patent is extended or adjusted under 35 U.S.C. 154(b) by 56 days.

(21) Appl. No.: 12/322,986

(22) Filed: Feb. 10, 2009

(65) Prior Publication Data

US 2010/0201100 A1    Aug. 12, 2010

(51) Int. Cl.
*B60D 1/07* (2006.01)
(52) U.S. Cl. .................. 280/416.1; 280/512; 280/515
(58) Field of Classification Search ............ 280/415.1, 280/416.1, 416.2, 511, 512, 515
See application file for complete search history.

(56) References Cited

U.S. PATENT DOCUMENTS

| | | | | |
|---|---|---|---|---|
| 2,940,775 | A * | 6/1960 | Farrow et al. | 280/416.1 |
| 2,968,494 | A * | 1/1961 | Klouda | 280/416.1 |
| 3,159,368 | A * | 12/1964 | Ahlbin et al. | 248/222.41 |
| 3,900,214 | A * | 8/1975 | Brockelsby | 280/414.1 |
| 3,951,434 | A * | 4/1976 | Sause | 280/416.1 |
| 6,217,054 | B1 * | 4/2001 | Klimek et al. | 280/511 |
| 6,530,249 | B1 * | 3/2003 | Burkhead | 70/14 |
| 7,673,894 | B2 * | 3/2010 | Bender | 280/406.1 |
| 2004/0232655 | A1 * | 11/2004 | Heitlinger | 280/515 |

* cited by examiner

*Primary Examiner* — Anne Marie M Boehler
(74) *Attorney, Agent, or Firm* — Dennis L. Thomte; Thomte Patent Law Office LLC (57) ABSTRACT

A hitch adapter for use with a forwardly extending tongue of an implement which enables the hitch on the forward end of the tongue to be converted from a clevis-type hitch to a hitch ball-type hitch. The hitch adapter of this invention may also be used with hitch balls having different diameters.

6 Claims, 6 Drawing Sheets

HITCH ADAPTER

BACKGROUND OF THE INVENTION

1. Field of the Invention

This invention relates to a hitch adapter which may be positioned on the forward end of a tongue which extends forwardly from an implement such as a trailer, material spreader, mower, sprayer, etc. and more particularly relates to a hitch adapter which enables switching a clevis type hitch which is frequently mounted on such a tongue to a ball hitch to enable the implement to be towed by a vehicle such as an ATV, UTV, garden tractor, riding mower, etc. Even more particularly, the hitch adapter of this invention may accommodate hitch balls of different diameters such as a 1⅞ inch hitch ball or a 2-inch hitch ball.

2. Description of the Related Art

Vehicles such as ATVs, UTVs, garden tractors, riding mowers or the like are frequently used to tow implements such as trailers, material spreaders, sprayers, mowers, etc. Usually, the implements have a forwardly extending tongue which have a clevis type hitch at the forward end thereof to enable the same to be coupled to a hitch plate, drawbar or receiver at the rearward end of the vehicle with the hitch plate, drawbar or receiver having a hitch pin opening formed therein which is adapted to receive a hitch-pin which extends through the clevis on the forward end of the tongue to couple the implement to the vehicle. If the vehicle has a hitch ball mounted on the hitch thereof, the clevis of the tongue cannot be coupled thereto. If the vehicle has a 1⅞ inch hitch ball mounted on the hitch thereof and the implement tongue has a 2-inch ball receiver mounted thereon, the 2-inch hitch ball receiver cannot be safely coupled to the 1⅞ inch ball. If the implement tongue has a 1⅞ inch hitch ball receiver thereon and the vehicle hitch has a 2-inch hitch ball mounted thereon, the tongue or the implement cannot be coupled to the hitch ball on the vehicle.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A hitch adapter is disclosed for mounting on the forward end of the tongue of an implement such as a trailer, material spreader, mower, spreader, etc. which selectively replaces a clevis type hitch on the forward end of the tongue to enable the tongue to be coupled to the hitch of a vehicle such as an ATV, UTV, garden tractor or riding mower regardless whether the hitch ball mounted on the vehicle is a 1⅞ inch or 2-inch hitch ball. The adapter comprises a base plate having a forward end and a rearward end with the base plate being adapted to be selectively removably secured to the forward end of the tongue so that the forward end of the base plate is positioned forwardly of the forward end of the tongue. The base plate has a hitch ball receiving opening, having forward and rearward ends, formed therein rearwardly of the forward end thereof. The hitch ball opening has a generally semi-circular portion at its rearward end and a generally U-shaped portion at its forward end with the U-shaped portion having a width less than the semi-circular portion. The semi-circular portion of a hitch ball receiving opening has a width sufficient to permit hitch balls with different diameters to be extended upwardly therethrough. The U-shaped portion of the hitch ball receiving opening has a width sufficient to receive the shank of the hitch ball when the hitch ball has been moved upwardly through the semi-circular portion of the hitch ball receiving opening and the tongue has been moved rearwardly with respect to the hitch ball or when the vehicle has been moved forwardly with respect to the tongue of the implement.

A generally horizontally disposed lock plate is positioned on the base plate and is pivotally moveable with respect thereto about a generally vertical axis. The lock plate is pivotally moveable with respect to the base plate between locked and unlocked positions. The forward end of the lock plate is positioned over a portion of the rearward end of the semi-circular portion of the hitch ball receiving opening beneath the upper ball portion of the hitch ball when the shank portion of the hitch ball is positioned in the U-shaped portion of the hitch ball receiving opening to prevent the disconnection of the tongue from the hitch ball. A retainer selectively connects the lock plate to the base plate when the lock plate is in its locked position. In one embodiment, the retainer comprises a pin extending through the lock plate and the base plate. In another embodiment, the retainer comprises a padlock shackle securing the lock plate to the base plate.

The tongue has bolt openings formed therein which normally are utilized to secure a clevis element to the tongue with the base plate being secured to the tongue by bolts extending through the bolt openings. When the clevis element has been removed from the tongue, it may be secured to the base plate in a stowed position by the bolts extending through the bolt openings. The adapter may be positioned in a stowed position on the tongue rearwardly of the clevis element by means of bolts extending through the clevis element and through the base plate of the adapter to secure bolt the clevis element and the adapter onto the forward end of the tongue of the implement. Thus, the tongue may be secured to the drawbar of the vehicle by means of a clevis element when the adapter is in its stowed position. The tongue may be secured to a ball hitch mounted on the vehicle when the adapter plate is in its operative position.

Thus, it can be seen that a novel hitch adapter has been provided which quickly and easily permits a tongue of an implement which normally has a clevis element thereon to be connected to a ball hitch on a vehicle.

A further object of the invention is to provide a hitch adapter which may be stowed on the implement tongue when the clevis element of the tongue is being utilized for coupling the tongue to the drawbar of a vehicle.

A further object of the invention is to provide a hitch adapter which will accommodate hitch balls of different diameters.

A further object of the invention is to provide a hitch adapter including a locking means which ensures that the tongue will not become disconnected from the vehicle during use of the adapter.

Yet another object of the invention is to provide a hitch adapter which may be mounted on the tongue of an implement utilizing the bolt openings which normally secure a clevis element to the forward end of the tongue.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
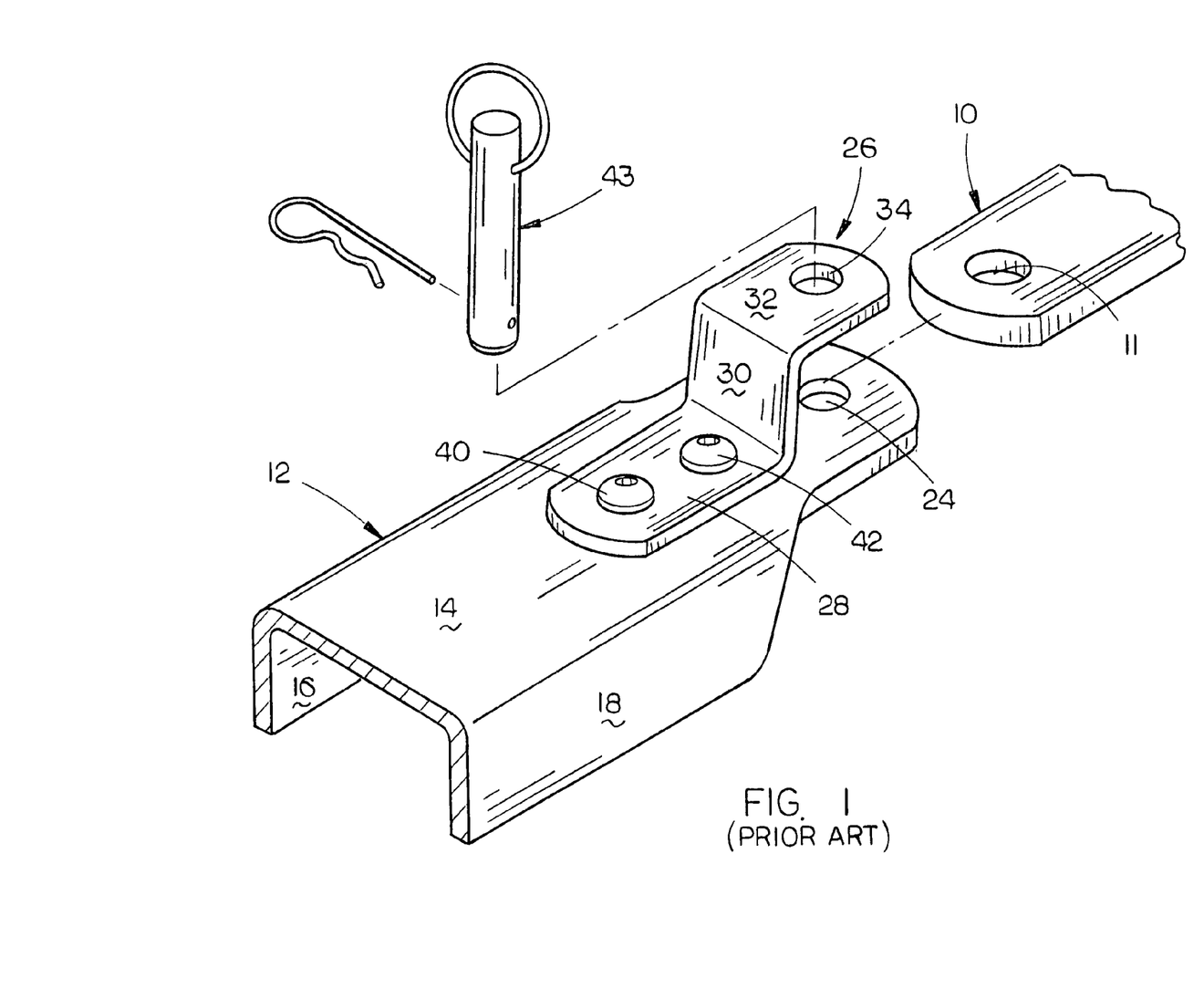
FIG. 1 is a partial perspective view illustrating an implement tongue having a clevis element at the forward end thereof to enable the tongue to be coupled to a vehicle drawbar.
Figure 8:
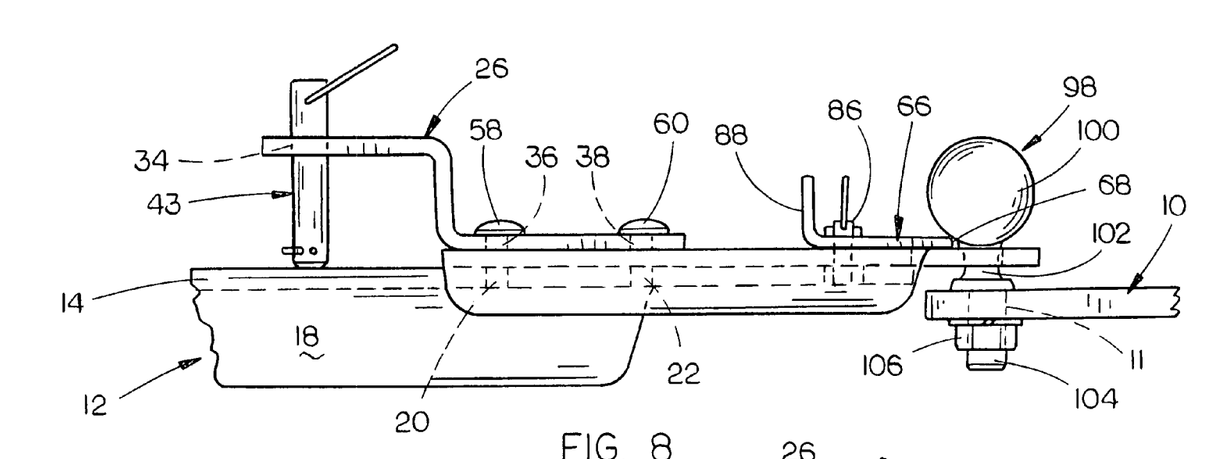
FIG. 8 is a side elevational view of the hitch adapter in its operative position with the lock plate locking the hitch adapter onto the hitch ball.

The numeral 10 refers to a drawbar extending from a vehicle (not shown) such as an ATV, UTV, garden tractor, riding mower, etc. having an opening 11 formed thereto which is adapted to receive a hitch pin or hitch ball as will be described in more detail hereinafter. A tongue 12 extends forwardly from an implement (not shown) such as a trailer, spreader, mower, harrow, etc. The prior art tongue 12 commonly has a channel-shaped cross-section defined by a top wall 14 and opposite side walls 16 and 18. Top wall 14 normally has a pair of bolt openings 20 and 22 formed therein (FIG. 8). Top wall 14 also has a hitch pin opening 24 formed therein adjacent the forward end thereof. As seen, the tongue 12 frequently has a clevis element 26 mounted thereon. Clevis 26 includes a horizontally disposed base portion 28, an upstanding wall portion 30 which extends upwardly from the forward end of base 28, and a forwardly extending upper wall portion 32 which extends horizontally from the upper end of wall portion 30. Upper wall portion 32 has a hitch pin opening 34 formed therein. Base portion 28 has a pair of bolt openings 36 and 38 formed therein.

Clevis element 26 is secured to tongue 12 by a pair of bolts 40 and 42 extending downwardly through bolt openings 36 and 38 respectively and through bolt openings 20 and 22 in top wall 14 of tongue 12 respectively. Nuts are mounted on the lower ends of the bolts 40 and 42 to maintain clevis element 26 in position wherein hitch pin opening 34 in clevis element 26 is directly above hitch pin opening 24 in tongue 12 so that a hitch pin 43 may be extended therethrough to connect the tongue 12 to the drawbar 10 or other types of hitches on the vehicle. In many cases, a 1⅞ inch hitch ball or a 2-inch hitch ball will be secured to the drawbar 10 or hitch of the vehicle which makes it impossible to secure the tongue 12 thereto since the hitch of the tongue is of the clevis type rather than the hitch ball socket type.

Figure 2:
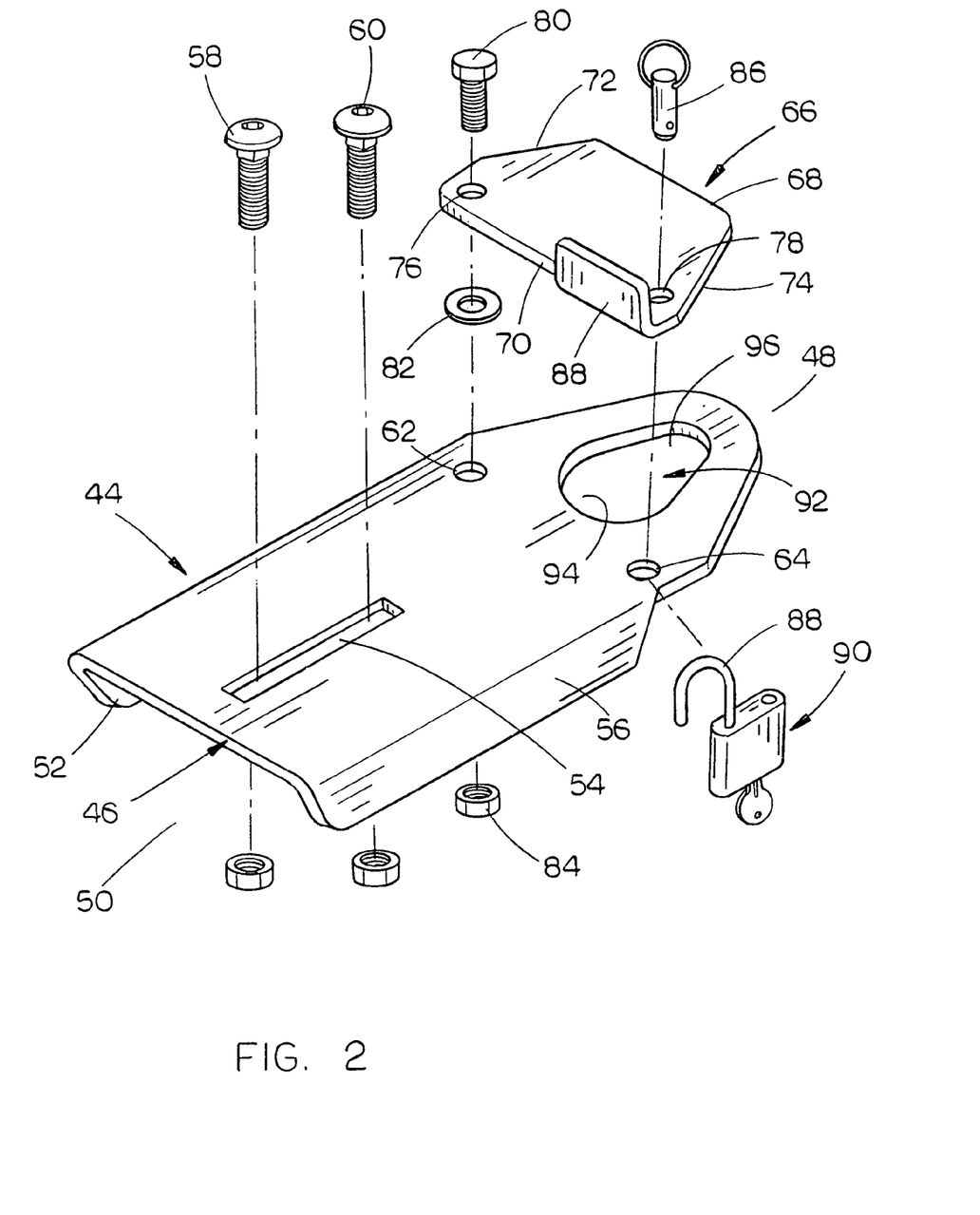
FIG. 2 is an exploded perspective view of the hitch adapter of this invention.

To enable the clevis type tongue to be connected to the vehicle hitch ball which may have different diameters, the instant quick hitch adapter has been provided which is referred to generally by the reference numeral 44. Adapter 44 includes a base plate 46 having a forward end 48 and a rearward end 50. Base plate 46 has a pair of side walls 52 and 54 extending downwardly therefrom as seen in FIG. 2. As seen, the forward end of base plate 46 is generally U-shaped to provide turning clearance for the hitch adapter 44. Base plate 46 has an elongated slot 56 formed therein forwardly of the rearward end thereof. Although a slot such as 56 is preferred, separate bolt openings could be provided. A pair of bolts 58 and 60 are adapted to extend downwardly through slot 56 as will be described hereinafter. Base plate 46 has an opening 62 formed therein adjacent side wall 52 rearwardly of the forward end thereof. Base plate 46 also has an opening 64 formed therein adjacent side wall 54 rearwardly of the forward end thereof.

The numeral 66 refers to a generally trapezoidal-shaped lock plate having a front edge 68, a rear edge 70 and side edges 72 and 74. Lock plate 66 has a pair of spaced-apart openings 76 and 78 formed therein which are adapted to register with openings 62 and 64 of base plate 46 respectively. A pivot pin or bolt 80 extends downwardly through opening 76, washer 82 which is positioned between lock plate 66 and base plate 46, and through opening 62 in base plate 44. Nut 84 is threadably mounted on the lower end of bolt 80 in conventional fashion.

Retaining pin 86 is adapted to be selectively extending downwardly through opening 78 in lock plate 66 and opening 64 in base plate 46. Lock plate 66 is provided with an upstanding wall segment 88 at its rearward end to enable a person to easily grasp the same to pivotally move locking plate 66 between its locked and unlocked positions when pin 86 is removed from lock plate 66 and base plate 46. The shackle 88 of padlock 90 may also be extended through openings 78 and 64 to lock the lock plate 66 in its locked position.

Base plate 46 has a hitch ball receiving opening 92 formed therein adjacent its forward end which includes a semi-circular portion 94 at its rearward end which communicates with a generally U-shaped portion 96 at its forward end. The semi-circular portion 94 of hitch ball receiving opening 92 is adapted to receive a hitch ball 98 secured to the drawbar or hitch of the vehicle having a 2-inch diameter or a hitch ball 98' having a 1⅞ inch diameter. Hitch ball 98 includes a ball portion 100, shank portion 102, threaded stud portion 104 and retaining nut 106.

Figure 3:
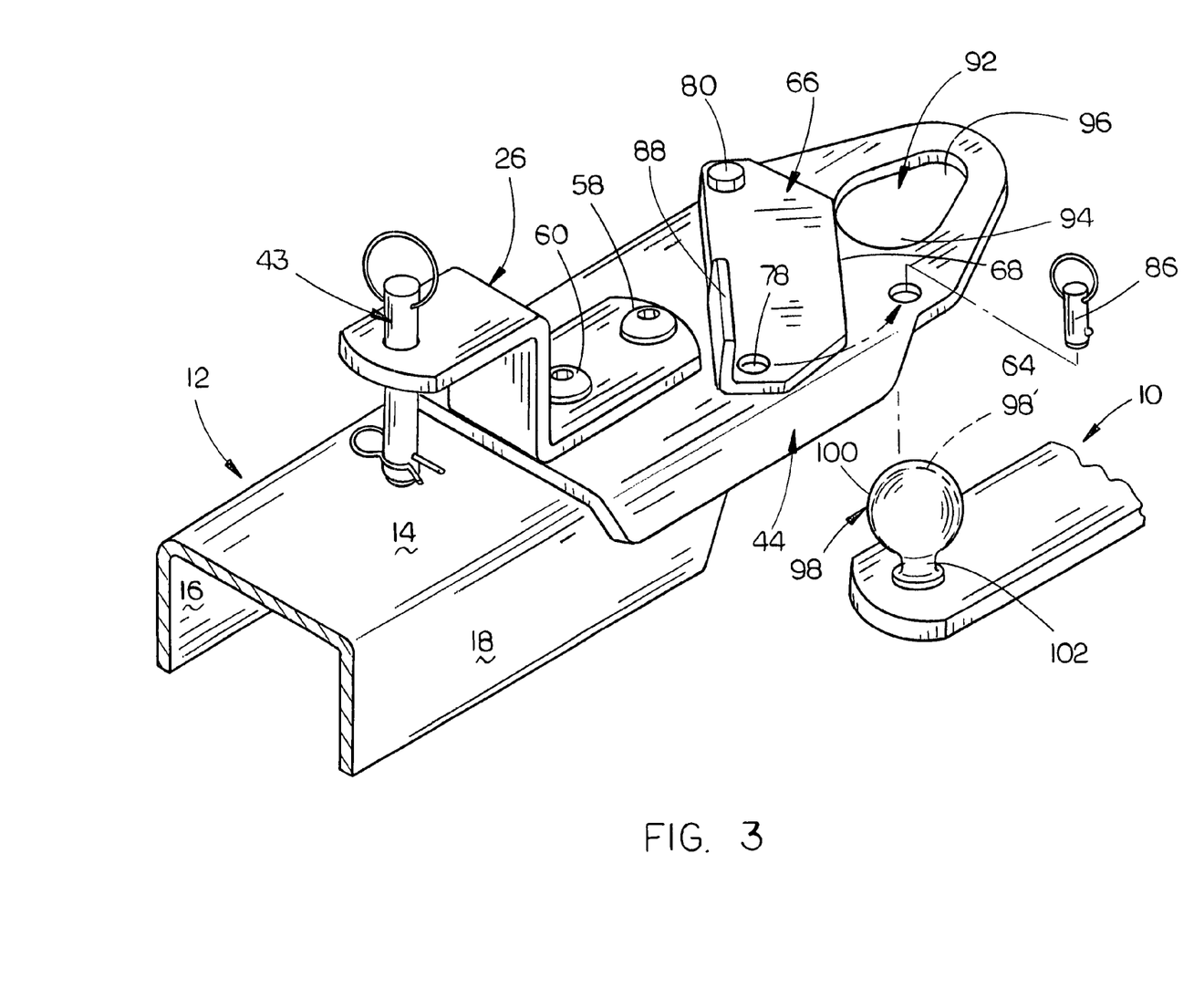
FIG. 3 is a partial perspective view illustrating the hitch adapter mounted on the forward end of the tongue with the clevis element stowed thereon.
Figure 4:
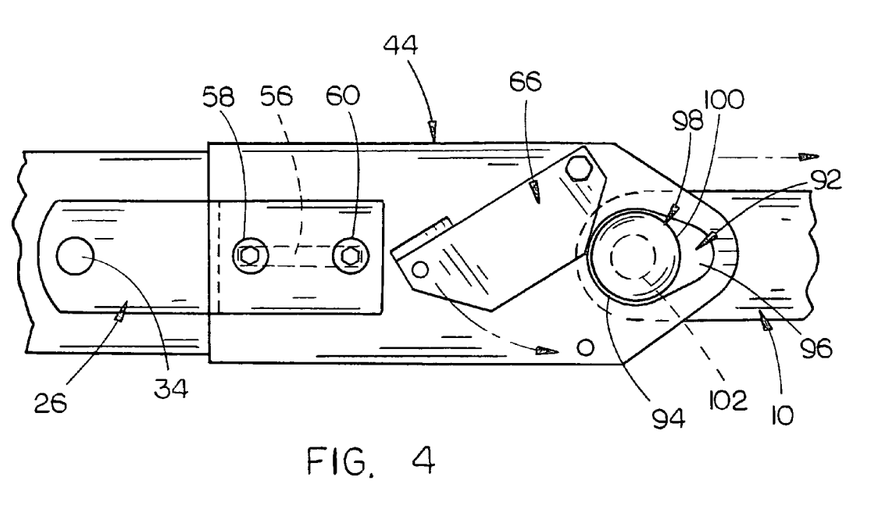
FIG. 4 is a top elevational view illustrating the hitch ball of the towing vehicle being received by the hitch ball receiving opening in the forward end of the hitch adapter.
Figure 5:
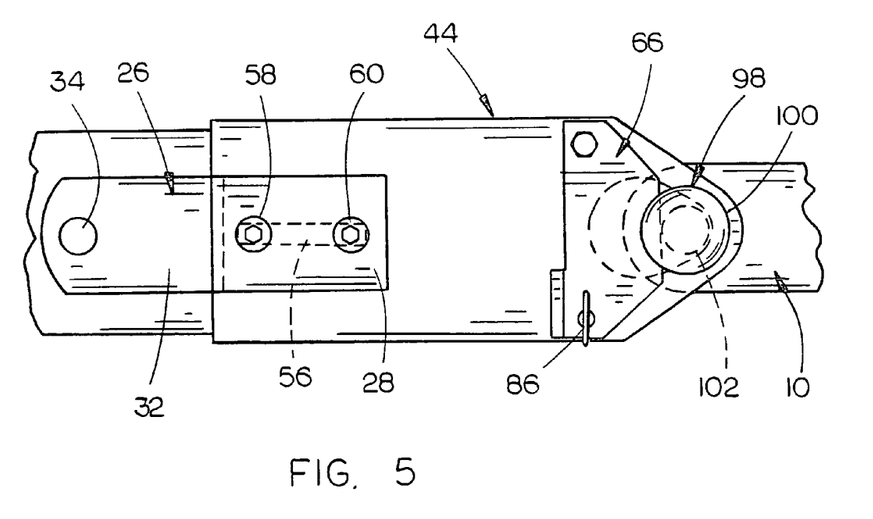
FIG. 5 is a view similar to FIG. 4 except that the hitch ball has been moved forwardly in the hitch ball receiving opening and the lock plate of the hitch adapter has been locked to prevent the hitch adapter from disconnecting from the hitch ball.

As seen in FIG. 1, the conventional tongue 12 which extends forwardly from an implement may be connected to the drawbar 10 by positioning the rearward end of the drawbar 10 into the clevis of the forward end of tongue and inserting the hitch pin 43 downwardly through openings 34, 11 and 24. If the drawbar 10 or the hitch of the vehicle has a hitch ball 98 mounted thereon, such as illustrated in FIG. 3, bolts 40 and 42 are removed from the clevis 26 and the tongue 12 so that clevis 26 may be removed from the tongue. The hitch adapter 44 is then positioned on the upper forward end of the tongue 12 with the bolts 58 and 60 being extended downwardly through the slot 56 and through the bolt openings 20 and 22 in the tongue 12. Nuts 84 are then secured to the lower ends of the bolts 58 and 60 to maintain the hitch adapter 44 on the tongue 12. If the retaining pin 86 has not been previously removed from the lock plate 66, the pin 86 will then be removed with the lock plate 66 being pivotally moved to its unlocked position as illustrated in FIG. 3 so that the hitch ball receiving opening 92 is unobstructed by the lock plate 66. The tongue or the vehicle is then maneuvered so that the hitch ball 98 may be moved upwardly through the semi-circular portion 94 of opening 92 with the same being possible regardless of whether the hitch ball has a 1⅞ inch diameter or a 2-inch diameter. When the hitch ball 98 has been completely received by the hitch ball opening 92, the vehicle is either driven forwardly or the implement is moved rearwardly so that the shank portion 102 of the hitch ball is received within the U-shaped portion 96 of opening 92. The lock plate 66 is then pivotally moved from its unlocked position of FIG. 3 to its locked position of FIG. 5 so that the forward edge 68 of lock plate 66 is received beneath the ball portion 100 and positioned closely adjacent the shank portion 102 of the hitch ball 98. The retaining pin 86 is then inserted downwardly through openings 78 in lock plate 66 and opening 64 in base plate 46 to maintain the lock plate 66 in its locked position to prevent accidental disengagement of the hitch adapter 44 from the hitch ball 98. The shackle 88 of the padlock 90 may be used rather than the pin 86 if so desired.

Thus, it can be seen that the hitch adapter 44 enables the tongue 12 to be secured to a ball hitch whether the hitch ball is 1⅞ inches or 2 inches in diameter. FIG. 3 illustrates a unique means for stowing or storing the clevis 26 when the same is not being used. As seen in FIG. 3, the clevis 26 may be positioned on top of the hitch adapter 44 with the bolts 58 and 60 being extended downwardly through the clevis 26, base plate 46 and through the bolt openings in the top wall of the tongue 12.

Figure 6:
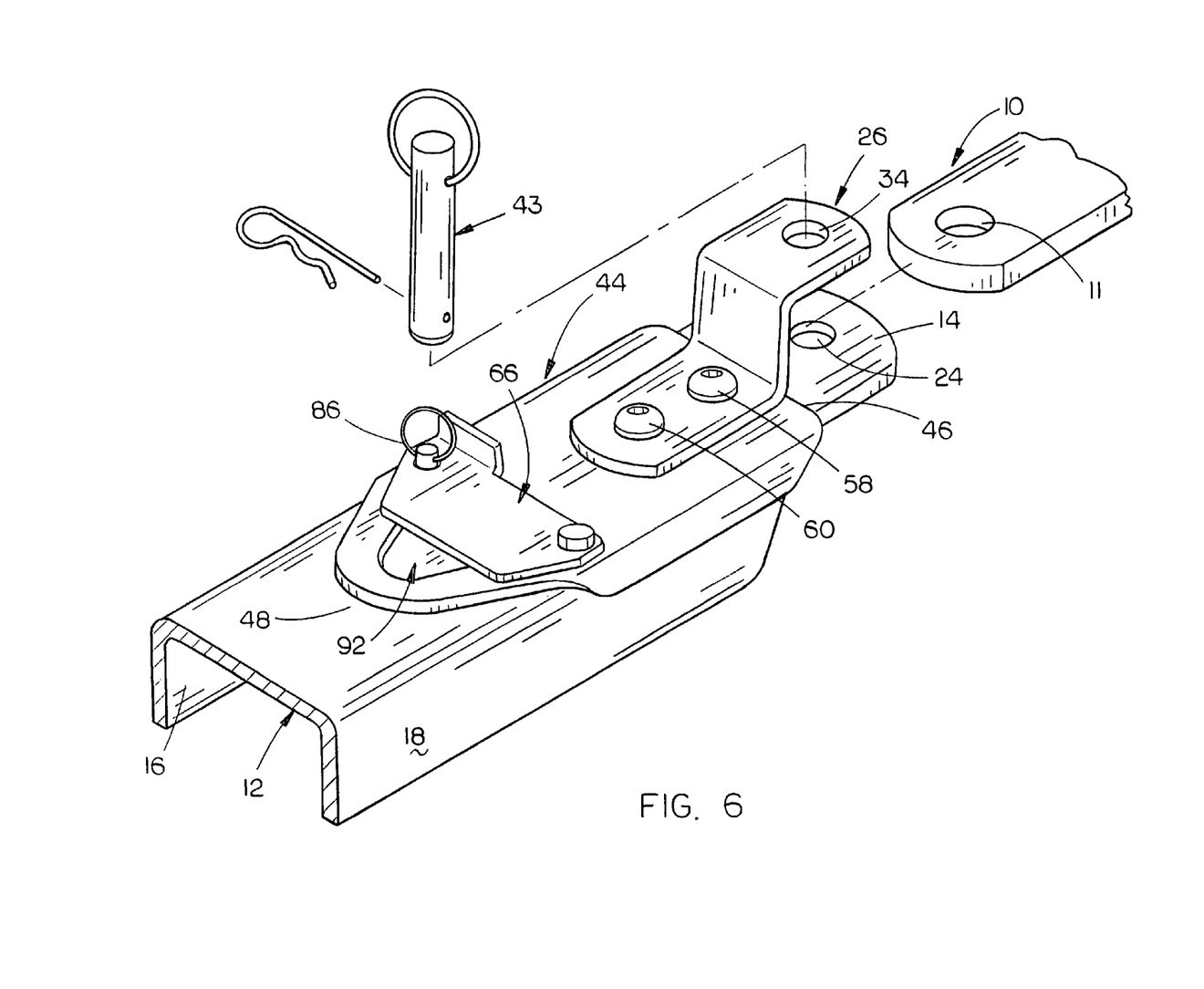
FIG. 6 is a partial perspective view illustrating the hitch adapter in a stowed position with the clevis element in its operative position.
Figure 7:
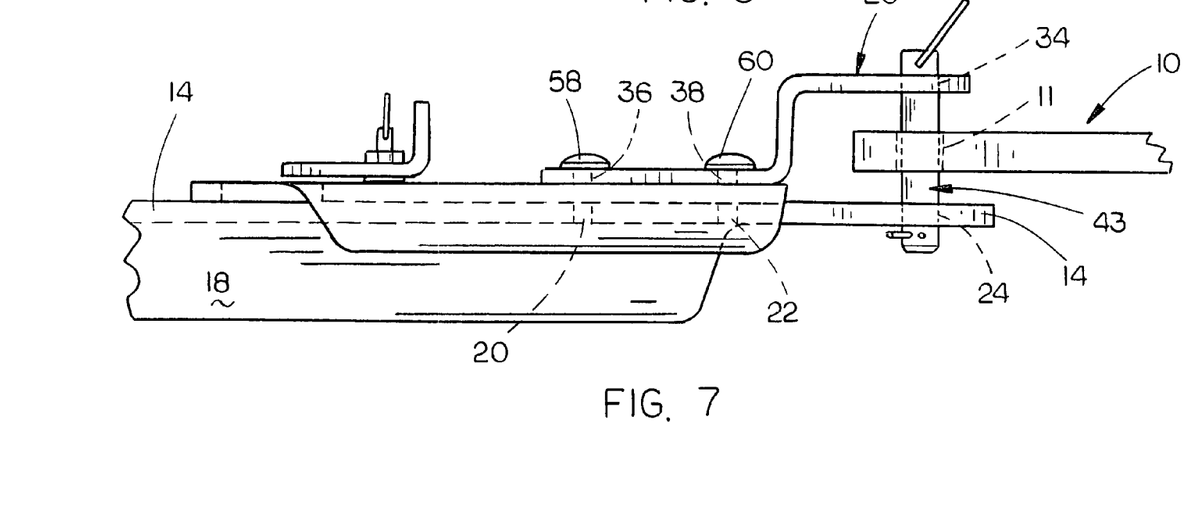
FIG. 7 is a partial side elevational view illustrating the hitch adapter in its stowed position and the clevis element in its operative position.

FIG. 6 illustrates a novel way of storing the hitch adapter 44 on the tongue 12 when it is desired to utilize a clevis 26 at the forward end of the tongue 12. As seen in FIG. 6, the hitch adapter 44 is reversed from its operative position so that the forward end 48 of the base plate 46 is positioned forwardly of the rearward end 50 of the base plate. As also seen in FIG. 6, the bolts 58 and 60 extend downwardly through the clevis 26, through the base plate 46 and through the bolt openings in the top wall of the tongue 12. If it is desired to utilize the tongue 12 with a ball hitch, the bolts 58 and 60 are removed, and the hitch adapter 44 is rotated 180° so that the hitch plate is in its operative position illustrated in FIG. 3.

It can therefore be seen that a novel hitch adapter has been provided which enables an implement tongue to be easily converted from a clevis-type to a ball-type hitch. The instant invention also provides a novel way of stowing the clevis when not being used and for stowing the hitch adapter when not being used. It can therefore be seen that the invention accomplishes all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. In combination:
an implement tongue which may be coupled to various diameter hitch balls mounted on a vehicle with the hitch ball having an upper ball portion, a shank portion extending downwardly from the upper ball portion with the shank portion having a diameter which is less than the diameter of the upper ball portion, and a threaded stud extending downwardly from the shank portion;

said implement tongue having an upper surface and a forward end;

said implement tongue having a hitch pin opening formed therein rearwardly of its forward end;

said implement tongue having first and second bolt openings formed therein rearwardly of said hitch pin opening in said tongue;

a clevis element including a horizontally disposed base portion having forward and rearward ends, an upstanding wall portion which extends upwardly from the forward end of said base portion, and a forwardly extending upper wall portion which extends horizontally from the upper end of said upstanding wall portion;

said base portion of said clevis element having a pair of spaced-apart bolt openings formed therein;

said upper wall portion having a hitch pin opening formed therein;

said clevis element being selectively movable on said implement tongue between operative and stowed positions;

said clevis element being selectively secured to said implement tongue in an operative position by a pair of bolts extending through said bolt openings in said base portion of said clevis element and said first and second bolt openings in said implement tongue so that said hitch pin opening in said upper wall portion of said clevis element is positioned above said hitch pin opening in said implement tongue in registering alignment therewith;

a hitch adapter secured to said implement tongue which may be positioned in an operative position on said implement tongue when said clevis element is positioned in its stowed position and which may be positioned in a stowed position on said implement tongue when said clevis element is positioned in its operative position;

said hitch adapter enabling the implement tongue to be coupled to various diameter hitch balls on the vehicle when in its said operative position and said clevis element is in its stowed position.

2. The combination of claim 1 wherein said hitch adapter comprises a base plate having a forward end, a rearward end and opposite sides;

said base plate adapted to be selectively removably secured to the forward end of said implement tongue so that said forward end of said base plate is positioned forwardly of the forward end of said implement tongue; said base plate having a hitch ball receiving opening having forward and rearward ends formed therein rearwardly of said forward end thereof; said hitch ball opening having a generally semi-circular portion at its said rearward end and a generally U-shaped portion at its said forward end; said U-shaped portion of said hitch ball receiving opening having a width which is less than the width of said semi-circular portion of said hitch ball receiving opening; said semi-circular portion of said hitch ball receiving opening having a width sufficient to permit different diameters of hitch balls to be extended upwardly therethrough; said U-shaped portion of said hitch ball receiving opening having a width sufficient to receive the shank of the hitch ball when the hitch ball has been moved upwardly through said semi-circular portion of said hitch ball receiving opening and said implement tongue has been moved rearwardly with respect to said hitch ball or when the vehicle has been moved forwardly with respect to said implement tongue; and a generally horizontally disposed lock plate positioned on said base plate and which is pivotally movable with respect thereto about a generally vertical axis; said lock plate having a forward end; said lock plate being pivotally movable with respect to said base plate between locked and unlocked positions; said forward end of said lock plate being positioned over a portion of the rearward end of said semi-circular portion of said hitch ball receiving opening beneath the upper ball portion of the hitch ball when the shank portion of the hitch ball is positioned in said U-shaped portion of said hitch ball receiving opening to prevent the disconnection of said tongue from the hitch ball; and a retainer selectively connecting said lock plate to said base plate when said lock plate is in its locked position.

3. The combination of claim 2 wherein said retainer comprises a pin extending through said lock plate and said base plate.

4. The combination of claim 2 wherein said retainer comprises a padlock shackle securing said lock plate to said base plate.

5. The combination of claim 2 wherein said base plate is secured to said implement tongue by bolts extending through said base plate and through said first and second bolt openings in said implement tongue when said clevis element is in its stowed position.

6. The combination of claim 5 wherein said clevis element, upon being moved to its stowed position is secured to said base plate by bolts extending through said pair of bolt openings in said base portion of said clevis element, through said base portion and through said first and second bolt openings in said implement tongue.

\* \* \* \* \*